March 29, 1938.  A. TRAVIS  2,112,638
TESTING DEVICE
Filed Nov. 12, 1934
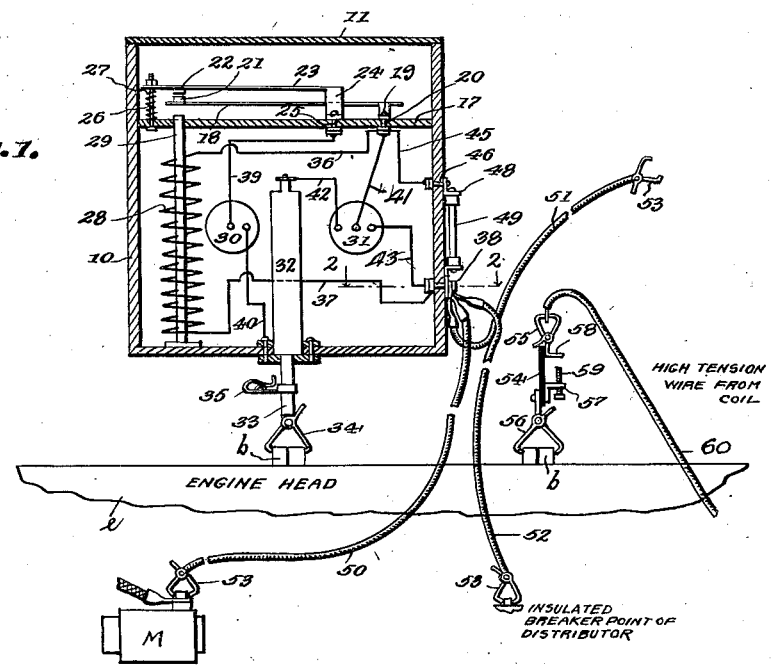
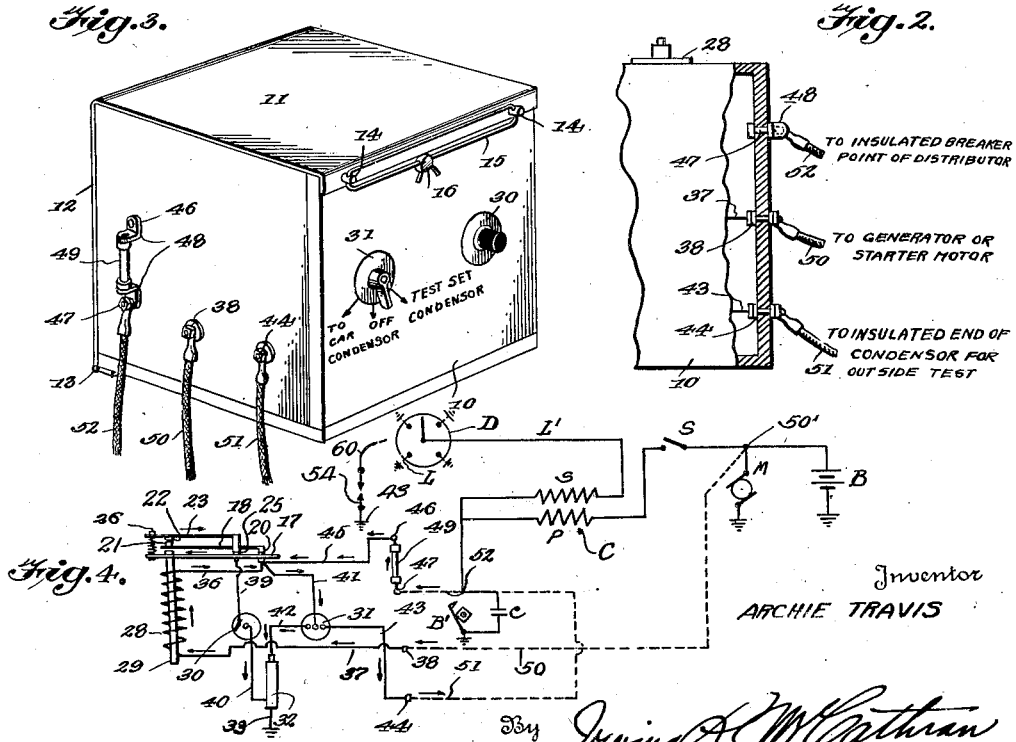
Inventor
ARCHIE TRAVIS Patented Mar. 29, 1938

2,112,638

UNITED STATES PATENT OFFICE 2,112,638

TESTING DEVICE

Archie Travis, Salem, Ky.

Application November 12, 1934, Serial No. 752,745

1 Claim. (Cl. 175—183)

This invention appertains to improvements in testing devices generally and more especially to a type thereof for testing certain classes of electrical circuits, particularly high tension ignition circuits of automobile motors and the like.

An object of the invention has to do with the provision of a compact and easily portable testing set for ignition systems and one that is of comparative simplicity in construction and operation and low cost in manufacture and which is especially designed for making tests in small garages and/or in localities where high voltage sources of electric current are not readily available for similar purposes.

Another object thereof resides in the provision of an electrical connection for the improved testing set which will have the dual function of grounding the circuit of the set and supporting the set conveniently in place for the accomplishment of a test.

With these and other objects and advantages in view, the invention resides in the certain new and useful combination, construction and arrangement of instrumentalities, parts and circuits as will be hereinafter more fully described, set forth in the appended claim, and illustrated in the accompanying drawing, in which:—

Figure 1 is a vertical section through the casing of the testing set and showing a rear view of the front panel carrying a preferred arrangement of instrumentalities and interior and exterior circuits as connected for test of the ignition circuit of an automobile motor;

Figure 2 is a fragmentary bottom view of the testing device, with a portion of the bottom and side walls broken away to show certain of the interior and exterior electrical circuit connections;

Figure 3 is a perspective view of the testing set casing and certain of the circuit instrumentalities and connections exteriorly thereof; and Figure 4 is a diagrammatical view of the circuits of the testing set and an ignition system.

Referring to the drawing, wherein like characters of reference designate corresponding parts throughout the several views, the embodiment of the invention exemplified therein is comprised in a casing 10 having its top and back walls 11 and 12 removable to give access to the interior thereof for inspection and maintenance purposes. If desired, the casing 10 may be made of wood and the top and back walls 11 and 12 of sheet metal, preferably in one piece, with the bottom edge of the back wall hinged, as at 13, to the rear edge of the bottom wall of the casing, in order that the two walls may be swung, as a unit, entirely clear of the casing when necessary. A suitable securement, such as the screws 14, is provided at the front side of the casing 10 for engagement with the top wall 11 in a manner to fasten it and the back wall 12 in place on the casing. The screws 14 preferably project from the front wall and are provided with openings diametrically thereof to receive a sealing means to prevent unauthorized removal; the sealing means preferably consisting of a length of wire 15 threaded through the openings in the screws 14 and a seal 16 engaged with the free ends of the wire.

Mounted within the casing and upon a horizontal partition 17 is a magnetically operated make and break device consisting of a vibrator 18 which is secured at one end in electrical connection, as at 19, to a contact screw 20 passed through the partition 17. A contact point 21 is carried on the opposite end of the vibrator 18 in opposition to a similar point 22 carried on a conductor arm 23; the latter also being in electrical connection at one end with a contact screw 25 mounted in the partition 17 by way of a bridge piece 24.

As shown, the vibrator 18 and the arm 23 are preferably made of spring metal and have angular offset portions to form the aforesaid electrical connections 19 and 24 respectively engaged with the contact screws 20 and 25. The opposite end of the arm 23 is engaged by a screw 26 rising from the partition 17 for its adjustment to vary the spacing of the contact points 21 and 22 as may be required. A coiled spring 27 is preferably mounted on the screw 26 between the partition 17 and the engaged part of the arm 23 to sustain the latter against the nut at the upper end of the screw at all times. By adjusting the position of the nut on the screw 26, the gap between the points 21 and 22 of the test breaker may be varied at will.

Motion is imparted to the vibrator 18 by an electromagnet consisting of a coil 28 encircling a soft iron core 29. This magnet is positioned beneath the partition 17 and has one end of its core 29 projecting through the latter and into operative proximity to the free end of the vibrator 18.

Mounted in openings in the front wall of the casing 10 are a pair of switches 30 and 31; the switch 30 being preferably of a standard pushbutton type and the switch 31 of a two-way oscillating type. These switches are preferably arranged in line horizontally of the front wall, as shown.

Rising within the casing 10 from the bottom wall thereof is a condenser 32 which has its lower end in electrical connection with a casing support 33 secured to the under side of the bottom wall. This support is preferably in the form of an angled metal member having its longer leg depending below the casing at the center thereof and constitutes the ground terminal of the testing circuits housed with the casing. The grounding of this support or terminal 33 is to be effected by means of a snap connector 34 carried at the free end of the terminal for engagement with, for instance, a head-bolt of an automobile engine (Figure 1). With the lower snap connector 34 firmly engaged with a head-bolt, the casing will be rigidly supported in place on the engine to facilitate the accomplishment of a test of the ignition system of the engine, as will be readily obvious, and, at the same time, an effective ground will be established between the testing circuits within the casing and the grounded side of the ignition circuit under test. A second snap connector 35 is provided at one side of the support 33 to receive a separate lead (not shown) to complete a test circuit in which the grounding of the device through the connector 34 is not required, as for instance, in testing out an ignition coil (not shown) apart from the remainder of an ignition system.

With these parts and instrumentalities thus emplaced, they are connected in circuit as follows:—The vibrator terminal 20 by a conductor 36 to one end of the magnet coil 28 which has its other end connected by a conductor 37 to a terminal screw 38 extending through a side wall of the casing. The other vibrator terminal 25 is connected by a conductor 39 to one of the contacts of the single point switch 30 which has its other contact connected by a conductor 40 to the grounded end of the condenser 32. The terminal 20 is also connected by a conductor 41 to the central or movable contact of the two-way switch 31 which has one of its remaining contacts connected by a conductor 42 to the upper or insulated terminal of the condenser 32 and the other of these contacts by a conductor 43 to a second terminal screw 44 (Figures 2 and 3) extending through the side wall of the casing 10 at one side of the terminal screw 38. The terminal 20 is further connected by a conductor 45 to a third terminal screw 46 also extending through the side wall of the casing 10 above and at the other side of the terminal screw 38.

Mounted on the outer end of the terminal screw 46 and a similar screw 47, extending through the casing in line with the terminal screws 38 and 44, are a pair of clips 48 between which a fuse 49 is supported. A lead 52 (preferably encased within insulation, colored green) is attached to the terminal screw 47 for connection to the insulated breaker point of the distributor (not shown) of the ignition system to be tested; a second lead 50 (preferably encased with insulation, colored red) to the terminal screw 38 for connection to a point on the positive side of the ignition circuit to be tested; and a third conductor 51 (preferably encased with insulation, colored green) to the terminal screw 44, for connection to the insulated end of the condenser to be tested. These several leads 50, 51, and 52, have their free ends each provided with a snap connector 53 to facilitate attachment to parts of the ignition circuit to be tested.

As shown in Figure 1, a test spark gap is provided and it consists of a block or strip 54 of an insulating material such as bakelite or the like, having snap connectors 55 and 56 secured to its opposite ends. Arranged in electrical connection with the lower clip 56 is an angled metal member 57 which has its offset portion spacedly opposed to a similar portion 58 of the upper snap connector 55 and provided with a screw 59 for adjustment relatively to the offset portion 58 to vary the length of the gap established therebetween.

In the use of the testing set as thus constructed and arranged, in certain instances at least two extra leads are to be employed for purposes which will appear in the following description of the several tests to be performed in ascertaining the working condition of an ignition system, such as the conventional form of ignition systems shown in Figure 4. However, practically all classes of six volt high tension systems, on all makes of automobiles, trucks and the like, may be effectively tested for the location of faults in the circuits and instrumentalities thereof, with only the usual battery of the ignition circuit under test at the moment being employed for the purpose.

In the several test steps to be here considered, the testing set will be supported in a convenient position for use by snapping the connector 34, at the lower side of the casing 10, to some part of an automobile that is in circuit with the grounded side of the ignition battery B, as by being engaged over a head-bolt b of the automobile motor or engine e; and the connector 56, of the test spark gap 54, over another of the head bolts b (Figure 1).

This set has two complete circuits in it, each of which picks up the current from one side of the battery and returns it through the frame of the motor driven vehicle back to the battery.

One circuit is from the starter, generator, or some hot wire on the automobile through conductors 50 and 37, coil 28, conductor 36, screw 20, vibrator 18, contact points 21 and 22, bridge 24, screw 25, conductor 39, switch 30, conductor 40, connector 34 to the motor back to the frame and then to the battery. By closing the switch 30 the circuit will be completed and operate the electrically energized make and break device in the test set only.

The second circuit is from the battery through wiring and the ignition switch and primary winding to the insulated breaker point in the distributor on the automobile. With the breaker points in the distributor open this circuit is not complete but by snapping the conductor 52 to the insulated breaker point current will flow through fuse 49, conductor 45, the vibrator contacts, conductor 39, switch 30, conductor 40, strap 33, and the snap 34 to the vehicle frame. Now by closing the switch 30, this circuit also will be complete.

It will be noted that in both circuits current will travel through the screw 20, vibrator points 21 and 22, bridge 24, screw 25, conductor 39, switch 30, conductor 40 and the snap 34 to the motor and through the frame to the battery.

Across the contact points 21—22, either of the two condensers may be connected by means of the double throw switch 31, to the moving contact of which terminal 20 is connected. One stationary contact of the switch 31 connects through wire 42 to condenser 32; while the other stationary contact connects through wire 43, terminal 44, and lead 51 to the ungrounded terminal of any condenser to be tested.

Now, to first test out the ignition system generally (except for the usual distributor D and the leads L therefrom to the spark plugs of the motor or engine e), the external lead 50, from the casing terminal 38, will be temporarily connected to the positive side of the battery B, for instance, to the positive terminal 50' of the starting motor M (Figure 4); and the external lead 52, from the casing terminal 48, to the insulated point of the ignition circuit breaker B'; after which, the cap of the distributor D will be removed and the high tension lead L' detached therefrom. The engine e will now be turned over until the breaker points break, and thereafter the detached end of the high tension lead L' will be engaged in the snap connector 55 at the ungrounded side of the test spark gap 54.

With the connections so made, the first test will be performed by first closing the ignition switch S; then the test switch 31 moved onto its left hand contact (see Fig. 4) to place the test condenser 32 in circuit; and thereafter the test switch 30; when, if the ignition circuit, including the battery B, ignition switch S, ignition coil C, high tension lead L', and the wiring between these parts or devices, are in proper working order, a hot spark should occur between the points 58 and 59 of the test spark gap 54, in which case current in the several circuits will be as follows:—

From battery B by way of the starting motor 50'; external lead 50; casing terminal 38; conductor 37; test breaker magnet coil 28; conductor 36; test breaker terminal 20; arm 18; contacts 21 and 22; terminal 25; conductor 39; test switch 30; conductor 40; casing support 33 and its snap connector 34 to ground and back to battery. At the test breaker terminal 20, this current is joined by the current passing from battery B to and through ignition switch S, coil C, the insulated point of the ignition breaker B', the external lead 52, fuse 49, and conductor 45. After passing through the test breaker this latter current flows back to the battery by way of conductor 39, switch 30, conductor 40, support 33, and its connector 34. It will be seen that both of the circuits in the test set follow the same course from test breaker terminal 20, vibrator 18, points 21, 22, and arm 33 and its snap connector 34 to the motor frame of the car back to battery B.

There are two circuits in the test set but they are both primary circuits. The first one is to operate the electrically operated make and break device, and by the electrically operated make and break device making and breaking the first circuit through the test set in order to make the electric magnet coil 28 operate or magnetize and de-magnetize, which pulls the vibrator down and releases it continuously and by doing so this breaks points 21 and 22, and by breaking points 21 and 22 also breaks the second primary circuit in the test set, that has been previously described. The breaking of this latter circuit causes coil C in the ignition circuit to throw off a current which travels through high tension lead L' from the coil to the snap connector 55 on test gap 54, from point 58 to screw 59, to snap connector 56, to motor, to frame to which battery B is connected.

The test condenser 32 is placed across the points 21 and 22 in test set when switch 31 is turned to the left. Any other condenser is placed across points 21 and 22 by turning switch 31 to the right and snapping snap connector 53 on lead 52 to the insulated end of the condenser and grounding the other end of the condenser to the motor or any other part of the car to which snap connector 34 on the casing support is attached. The test condenser 32 or any condenser to be tested may be connected across points 21 and 22.

Should no spark occur at the test gap 54 at this time, the next step in the test is to be made with the same conditions as before, except that both terminals of the coil primary are disconnected from the ignition circuit, the connector 52 removed from the point of breaker B' and connected to one side of the coil primary and the other side of the coil primary connected to point 50'. Now upon again closing test switch 30, if there is a good spark at the gap 54, the fault is indicated to be in the ignition switch S, but if there is no spark at the test gap, it will be an indication that the ignition coil C is dead. Here the current flow will be from the battery B by way of lead 50, terminal 38, conductor 37, magnet coil 28, and by way of the arm 18, contact points 21 and 22, arm 23, terminal 25, conductor 39, test switch 30, and conductor 40 to the ground. Current will also flow from battery B through point 50', coil primary, conductor 52, fuse 49, conductor 45 to point 20 and through points 21 and 22 to the ground. The secondary current in the winding s of the ignition coil C will pass to the test gap 54 as in the first instance.

If this coil is in good condition, it may be used to test other elements of the ignition system as follows:

To test the ignition condenser c, the test switch 31 will first be set to its right-hand position (Fig. 4) and the lead 51 connected to the insulated point of the breaker B' to which the ungrounded end of the condenser c is attached, and then the test switch 30 closed. Now if the ignition condenser c is in proper working order, there will be a strong spark at the test gap 54, but if no spark occurs, it will be an indication that the condenser is dead.

To test out the rotor of the distributor D, the lead L' is removed from connector 55 and attached to the spring on the rotor. The other end of the rotor is connected to connector 55 by a wire 60. If the rotor is in good condition there will be sparking at the test gap 54, but if there is none it will indicate that the rotor is shorted to ground.

To test the leads L extending from the cap of the distributor D to the spark plugs of the engine, the bared end of the high tension lead L' will be contacted with the distributor cap points, one at a time, and the test gap 54 will be connected at one end to ground and thereafter contacted at its other end successively by the spark plug end of that lead L to which the high tension lead L' is connected. With the points 58 and 59 of the test gap 54 adjusted to a three-eighths inch gap, hot sparking should ensue at the gap to indicate that the leads L are free from leaks of current through the insulation thereof, while weak or no sparking will indicate that the insulation of a particular lead is defective.

The testing set thus provided has the obvious advantages that it is simple in structural makeup and arrangement of parts and circuits which gives to it an extremely low cost in manufacture, simplicity in operation to the point of eliminating need on the part of a user of a wide technical knowledge of the several ignition systems employed on various makes of automobiles, ease in transporting from one point of use to another, and convenience in setting up and manipulation of parts and controls for and during the performance of testing operations.

It will be understood that, while a preferred embodiment of the testing set has been described and shown herein in more or less detail, equivalent and other changes in circuits and substitution of equivalent instrumentalities may be resorted to, without departing from the spirit of the invention or its scope as claimed.

Having described the invention, what is claimed as new is:

In a testing device of the character described, a casing, a condenser disposed vertically in said casing and having an end portion extending through the bottom of the casing, means for grounding the outer end of said condenser upon an engine to be tested, a make and break device extending horizontally in the upper portion of said casing having a stationary arm and a vibrator arm, an electro-magnet extending vertically in the casing under the make and break device for actuating said vibrator arm, a terminal secured through a side wall of the casing, a conductor connecting said terminal with the lower end of the coil of the electro-magnet, a conductor connecting the other end of the coil of the electro-magnet with the fixed end of the vibrator arm, a two-point switch having a movable contact connected in circuit with the stationary arm and a stationary contact grounded to the lower end portion of said condenser, a three-point switch having one stationary contact connected with the upper end of said condenser and its other stationary contact connected with a terminal extending through a side wall of the casing, the movable contact of the three-point switch being connected with a fixed end of the vibrator arm, a fuse, and terminals carrying said fuse, one terminal for the fuse extending through the wall of the casing and connected with the fixed end of the vibrator arm.

ARCHIE TRAVIS.